(12) United States Patent
Yamamoto et al.

(10) Patent No.: US 7,237,831 B2
(45) Date of Patent: Jul. 3, 2007

(54) MOUNTING STRUCTURE FOR COCKPIT MODULE AND RELATED METHOD

(75) Inventors: Tetsuya Yamamoto, Commerce, MI (US); Asako Yoshinami, Zama (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 125 days.

(21) Appl. No.: 11/147,306

(22) Filed: Jun. 8, 2005

(65) Prior Publication Data

US 2005/0275247 A1 Dec. 15, 2005

(30) Foreign Application Priority Data

Jun. 10, 2004 (JP) ............................ P2004-172716

(51) Int. Cl.
*B60K 37/00* (2006.01)

(52) U.S. Cl. ................................. 296/193.04

(58) Field of Classification Search ........... 296/193.04, 296/70, 71, 72, 73, 193.01
See application file for complete search history.

(56) References Cited

U.S. PATENT DOCUMENTS

| | | | | |
|---|---|---|---|---|
| 5,564,769 | A * | 10/1996 | Deneau et al. ................ | 296/72 |
| 5,938,266 | A * | 8/1999 | Dauvergne et al. ........... | 296/70 |
| 6,634,693 | B2 * | 10/2003 | Straesser, Jr. ................ | 296/70 |
| 6,659,405 | B1 * | 12/2003 | Takagi et al. ............... | 248/27.1 |
| 6,695,374 | B1 * | 2/2004 | Gebreselassie et al. ..... | 296/24.3 |
| 6,736,439 | B2 * | 5/2004 | Yasuta et al. ................. | 296/72 |
| 2002/0008399 | A1 * | 1/2002 | Yasuta et al. ................. | 296/72 |
| 2003/0141738 | A1 * | 7/2003 | Straesser, Jr. ................ | 296/70 |
| 2004/0108745 | A1 * | 6/2004 | Yang ............................. | 296/72 |
| 2004/0207228 | A1 * | 10/2004 | Gebreselassie et al. ....... | 296/70 |

FOREIGN PATENT DOCUMENTS

| | | |
|---|---|---|
| DE | 43 37 467 A1 | 5/1994 |
| DE | 197 52 073 A1 | 5/1999 |
| EP | 1 253 069 A2 | 10/2002 |
| JP | 2000-313248 A | 11/2000 |

* cited by examiner

*Primary Examiner*—H Gutman
(74) *Attorney, Agent, or Firm*—McDermott Will & Emery LLP

(57) ABSTRACT

A mounting structure for mounting a cockpit module onto a vehicle body on a side facing a vehicle compartment is provided with a mount member mounting a cockpit module onto a vehicle body, a resilient member disposed between the vehicle body and the cockpit module, and a guide mechanism guiding the cockpit module along a given transfer path when the cockpit module is transferred to a mount position of the vehicle body. The guide mechanism guides the cockpit module in a way to allow the cockpit module to move downward of the vehicle body in an oblique direction through at least a partial segment of the given transfer path such that an own weight of the cockpit module is allowed to apply on the resilient member to press the resilient member between the vehicle body and the cockpit module.

11 Claims, 12 Drawing Sheets

MOUNTING STRUCTURE FOR COCKPIT MODULE AND RELATED METHOD

BACKGROUND OF THE INVENTION

The present invention relates to a mount structure for a cockpit module and a related method and, more particularly, to a mount structure for a cockpit module, equipped with an instrument panel and the like while unitizing such components, and its related method.

Japanese Patent Application Lai-Open Publication No. 2000-313248 discloses a mounting structure for a cockpit module, which is mounted from a side facing a vehicle compartment toward a vehicle body front, wherein a pin is provided on the vehicle body, while a channel is provided in the cockpit module, to allow the pin to be guided along the channel such that the cockpit module is moved to a given mount position along a profile of the channel.

SUMMARY OF THE INVENTION

However, upon studies conducted by the present inventors, it has been a general practice for a vehicle body panel, onto which the cockpit module is mounted in abutting engagement, that is, a dash panel by which the vehicle compartment and an engine room are defined, to be provided with a through-hole in order to pass pipes, of an air conditioning unit, which extend from the cockpit module to a vehicle body front, that is, toward the engine room.

Since the through-hole provides fluid communication between the engine room and the vehicle compartment, a gap formed around the pipes in the through-hole needs to be preferably filled in with a seal member for the purpose of enhancing water-tightness and sound insulating properties. To this end, a seal member, with a given thickness and serving as a resilient member, may be provided on peripheries of the pipes whereby when the cockpit module is mounted onto the vehicle body panel, the seal member is collapsed and expanded by means of the cockpit module to fill in the gap.

However, since the seal member is formed of resilient member, it is conceived for a demanded force to increase by a component corresponding to a reaction force of the seal member, when the cockpit module is transferred to the mount position, to force a worker to bear the burden.

The present invention has been completed upon such studies conducted by the present inventors and has an object to provide a mounting structure for a cockpit module and its related method which reliably enable reduction in a pressing force needed for assembling work.

To achieve the above object, one aspect of the present invention provides a mounting structure for mounting a cockpit module onto a vehicle body on a side facing a vehicle compartment, comprising: a mount member mounting a cockpit module onto a vehicle body; a resilient member disposed between the vehicle body and the cockpit module; and a guide mechanism guiding the cockpit module along a given transfer path when the cockpit module is transferred to a mount position of the vehicle body, the guide mechanism guiding the cockpit module in a way to allow the cockpit module to move downward of the vehicle body in an oblique direction through at least a partial segment of the given transfer path such that an own weight of the cockpit module is allowed to apply on the resilient member to press the resilient member between the vehicle body and the cockpit module.

In other words, another aspect of the present invention provides a mounting structure for mounting a cockpit module onto a vehicle body on a side facing a vehicle compartment, comprising: mounting means for mounting a cockpit module onto a vehicle body; dimensionally changing means for changing a shape dimensionally and resiliently, the dimensionally changing means being disposed between the vehicle body and the cockpit module; and guiding means for guiding the cockpit module along a given transfer path when the cockpit module is transferred to a mount position of the vehicle body, the guiding means guiding the cockpit module in a way to allow the cockpit module to move downward of the vehicle body in an oblique direction through at least a partial segment of the given transfer path such that an own weight of the cockpit module is allowed to apply on the dimensionally changing means to press the dimensionally changing means between the vehicle body and the cockpit module.

Besides, another aspect of the present invention provides a method of mounting a cockpit module onto a vehicle body on a side facing a vehicle compartment, comprising: providing a resilient member between a vehicle body and a cockpit module; guiding the cockpit module along a given transfer path when the cockpit module is transferred to a mount position of the vehicle body to allow the cockpit module to move downward of the vehicle body in an oblique direction through at least a partial segment of the given transfer path; causing an own weight of the cockpit module to act on the resilient member to press the resilient member between the vehicle body and the cockpit module; and mounting the cockpit module onto the vehicle body.

Other and further features, advantages, and benefits of the present invention will become more apparent from the following description taken in conjunction with the following drawings.

DETAILED DESCRIPTION OF THE PREFERRED EMBODIMENT

Figure 1:
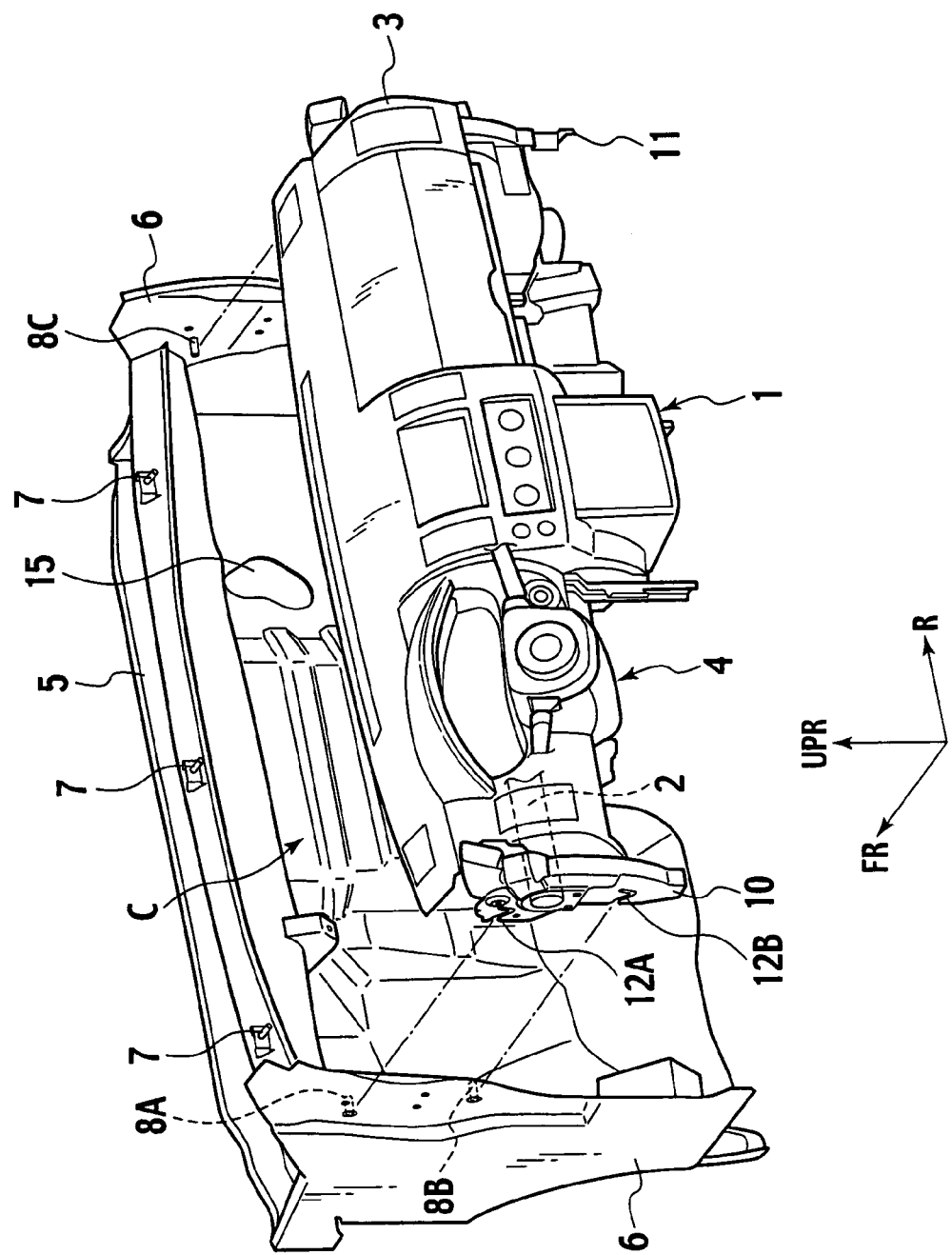
FIG. 1 is an exploded perspective view showing a state in which a cockpit module and a dash panel are viewed toward a vehicle body front-side from a vehicle body backside in the presently filed embodiment according to the present invention.

Hereinafter, a mounting structure of a cockpit module and its related method of an embodiment according to the present invention are described below in detail with reference to FIG. 1 to FIG. 10C. Incidentally, in the drawing figures, an arrow "FR" indicates a front direction of a vehicle body, an arrow "R" a right direction of the vehicle body and an arrow "UPR" an upper direction of the vehicle body with the arrow "FR", the arrow "R" and the arrow "UPR" forming a three-axis rectangular coordinate system.

Hereunder, descriptions as to various directions in the presently filed embodiment conform to such a coordinate system.

Figure 2:
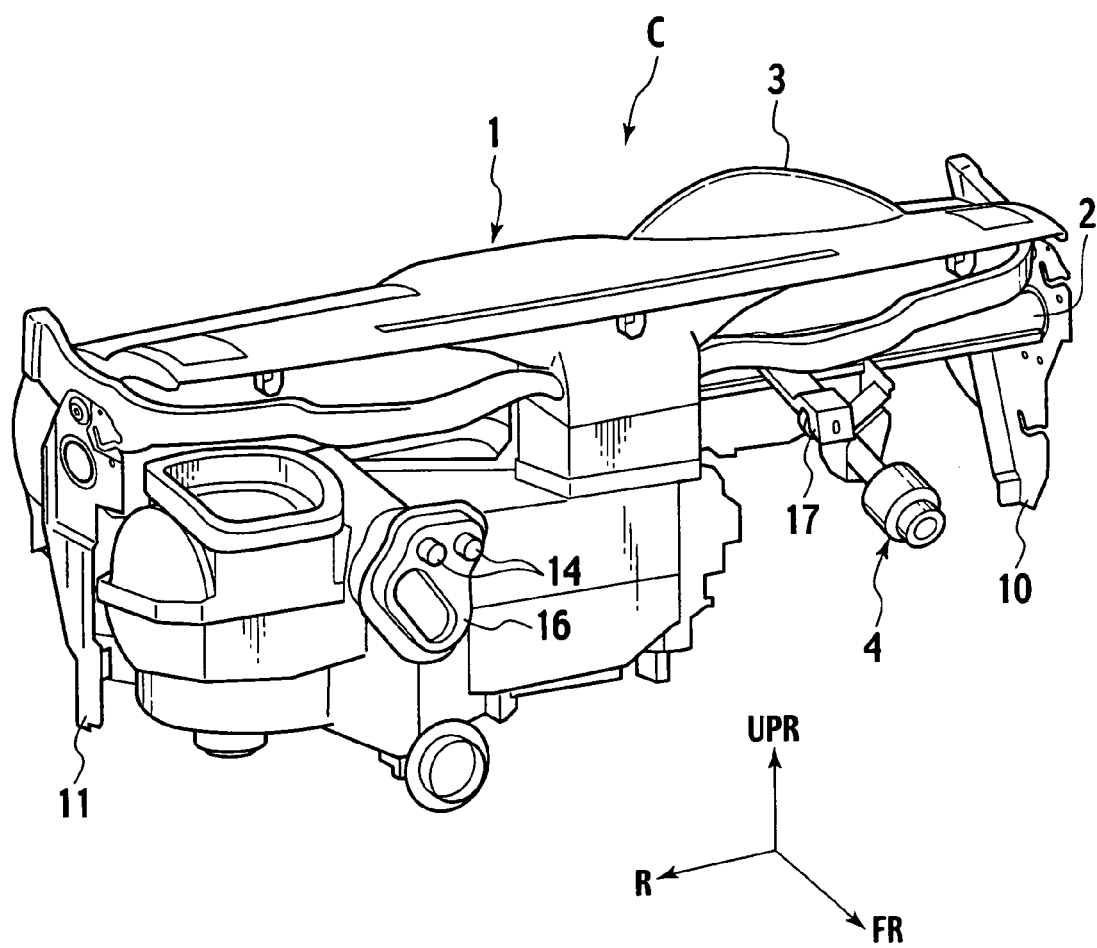
FIG. 2 is a perspective view showing an abutment side, associated with the vehicle body, of the cockpit module as viewed toward the vehicle body backside from the vehicle body front-side in the presently filed embodiment.
Figure 3:
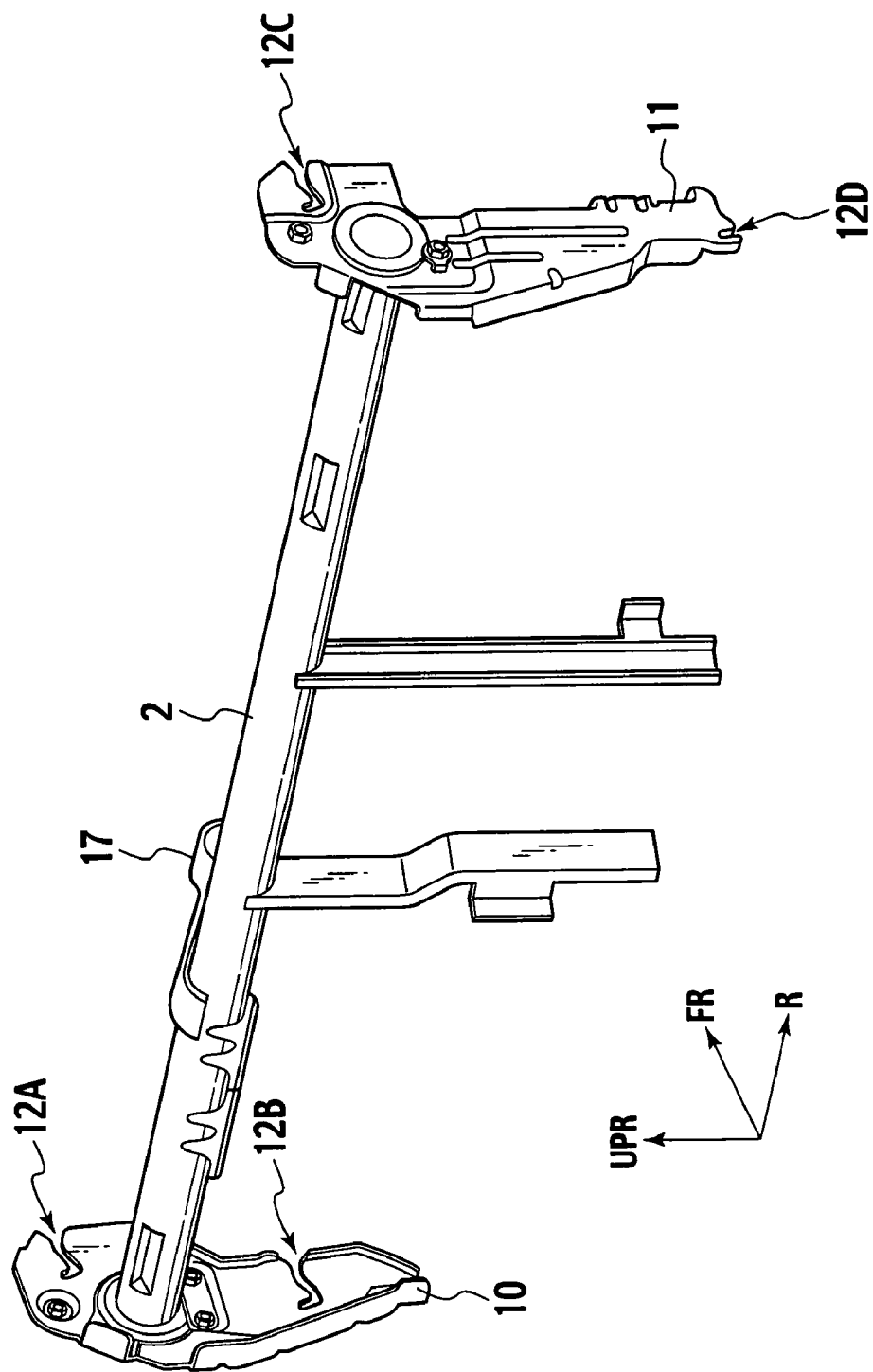
FIG. 3 is a perspective view showing a framework member of the cockpit module in the presently filed embodiment.
Figure 4:
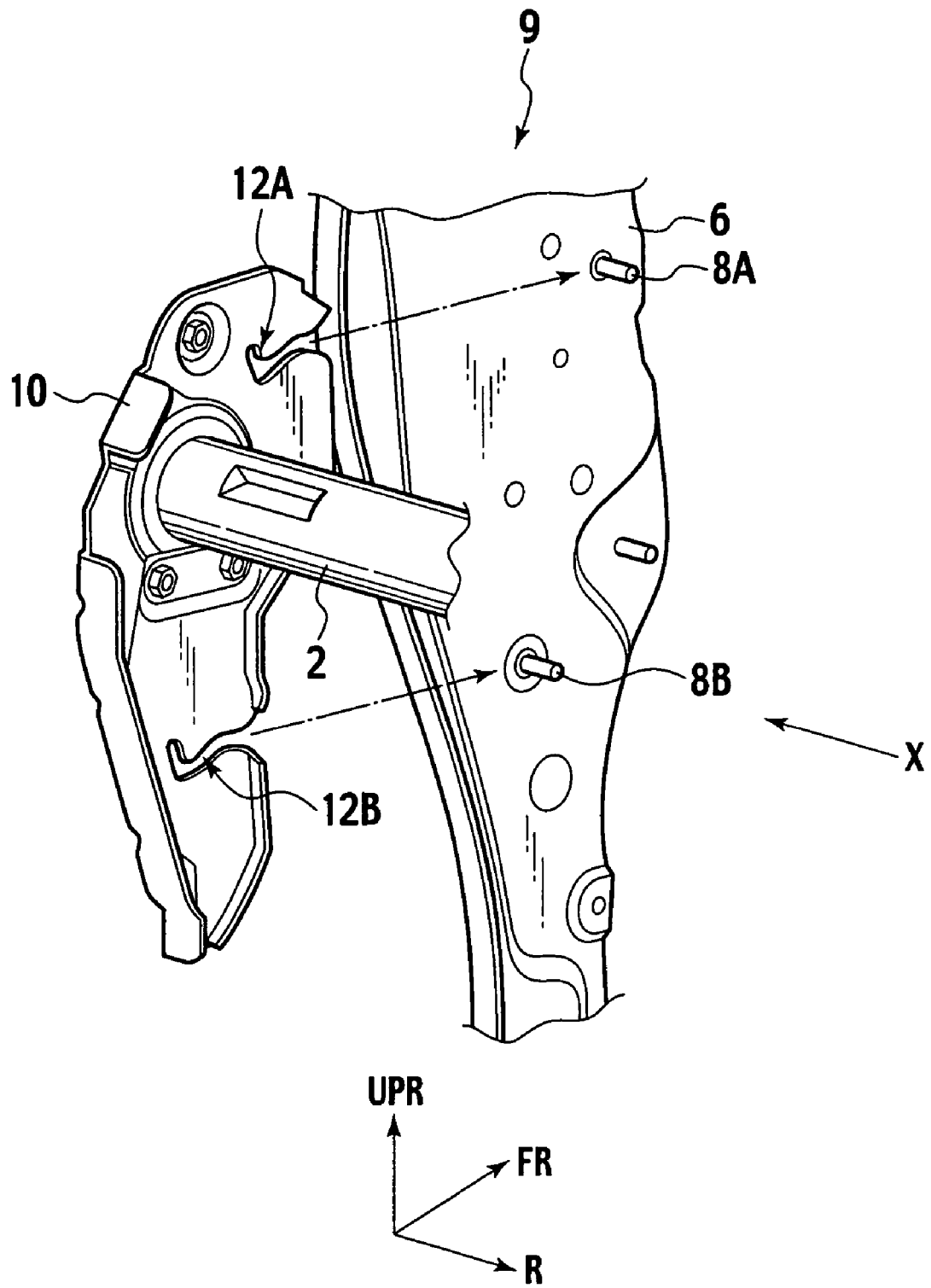
FIG. 4 is a partially exploded perspective view showing a flange member located on a left end of the framework member of the cockpit module and a left side front pillar to which the flange member is mounted in the presently filed embodiment.
Figure 5:
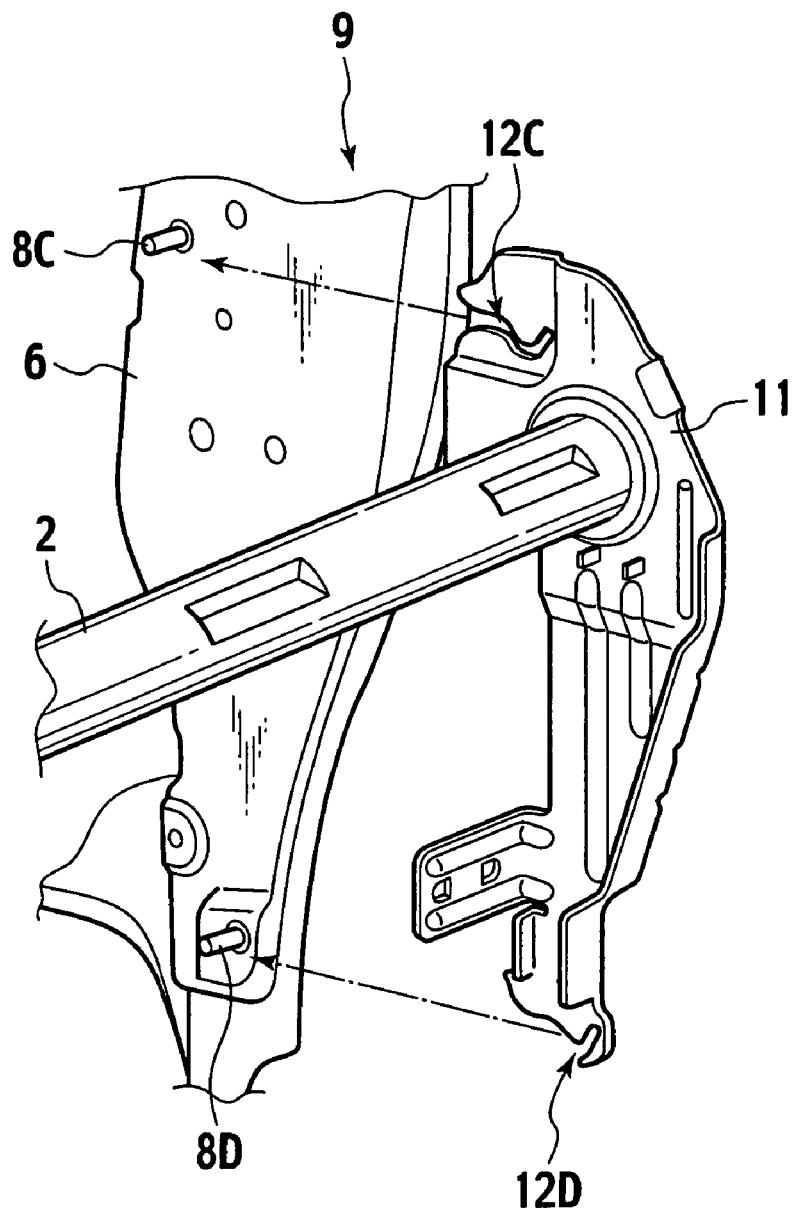
FIG. 5 is a partially exploded perspective view showing a flange member located on a right end of the framework member of the cockpit module and a right side front pillar to which the flange member is mounted in the presently filed embodiment.
Figure 5:
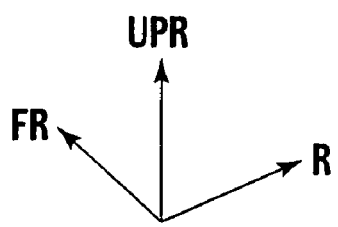
Figure 6:
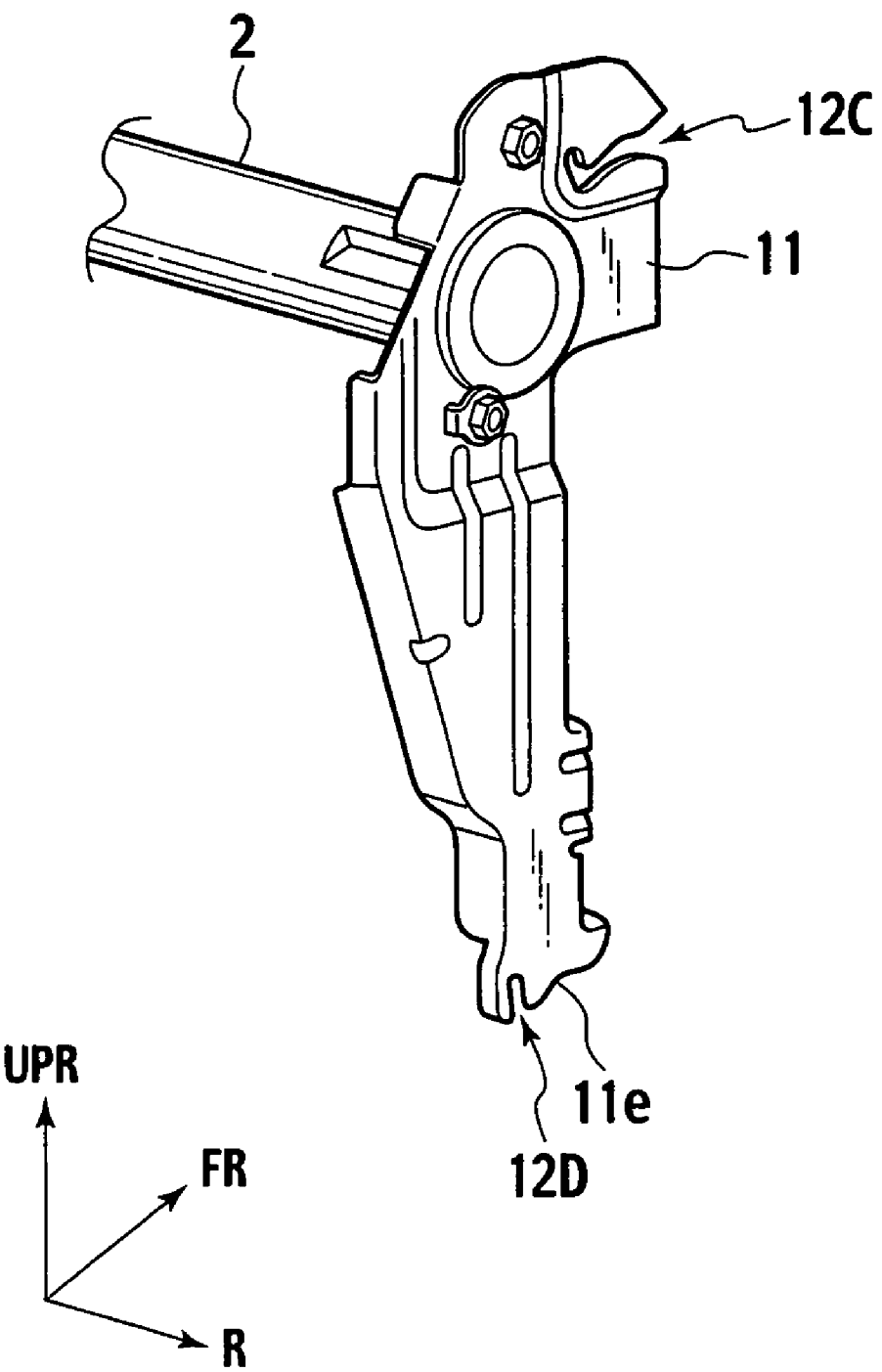
FIG. 6 is a perspective view showing a right side surface of the flange member shown in FIG. 5.
Figure 7:
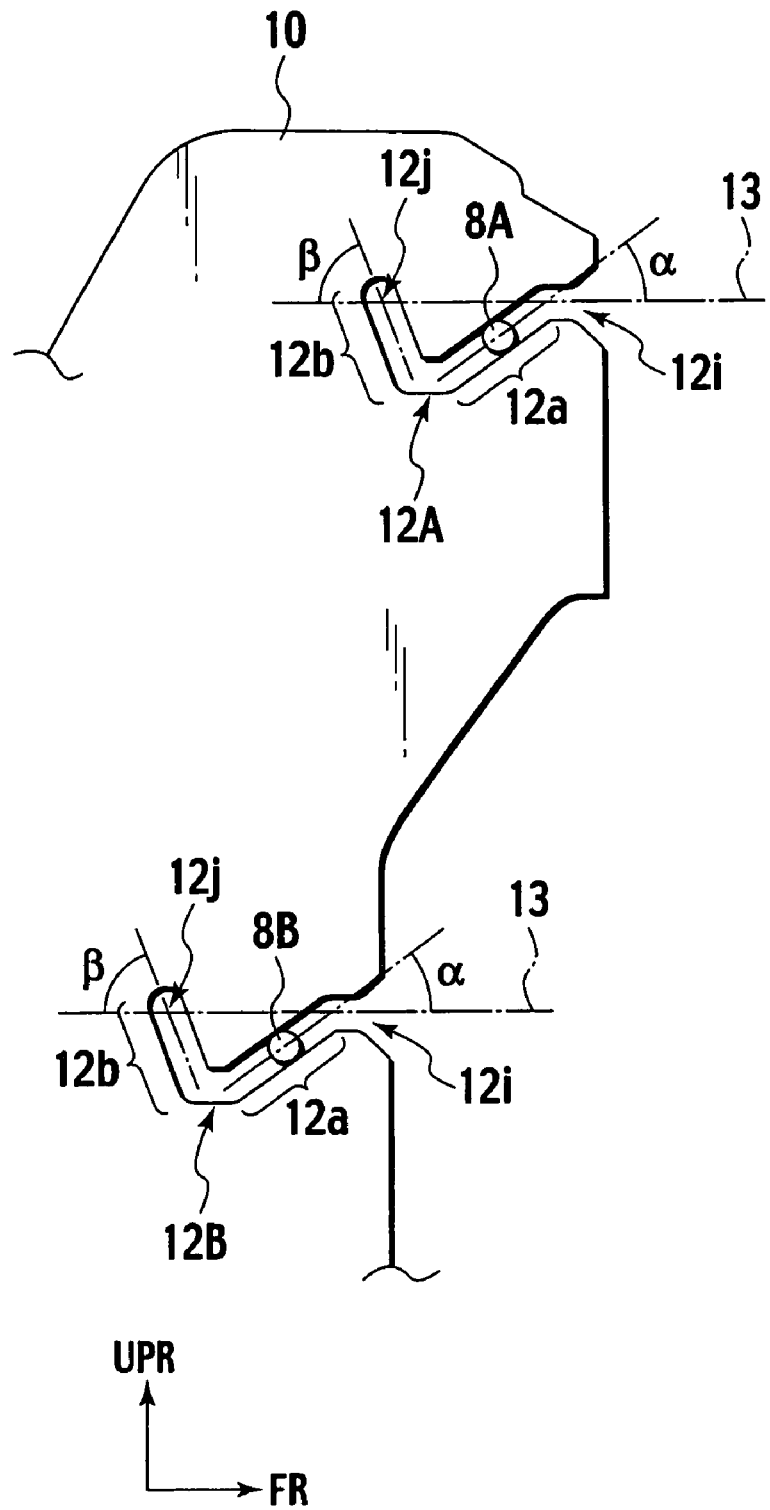
FIG. 7 is a schematic side view of the flange member as viewed along an X-direction shown in FIG. 4.
Figure 8A:
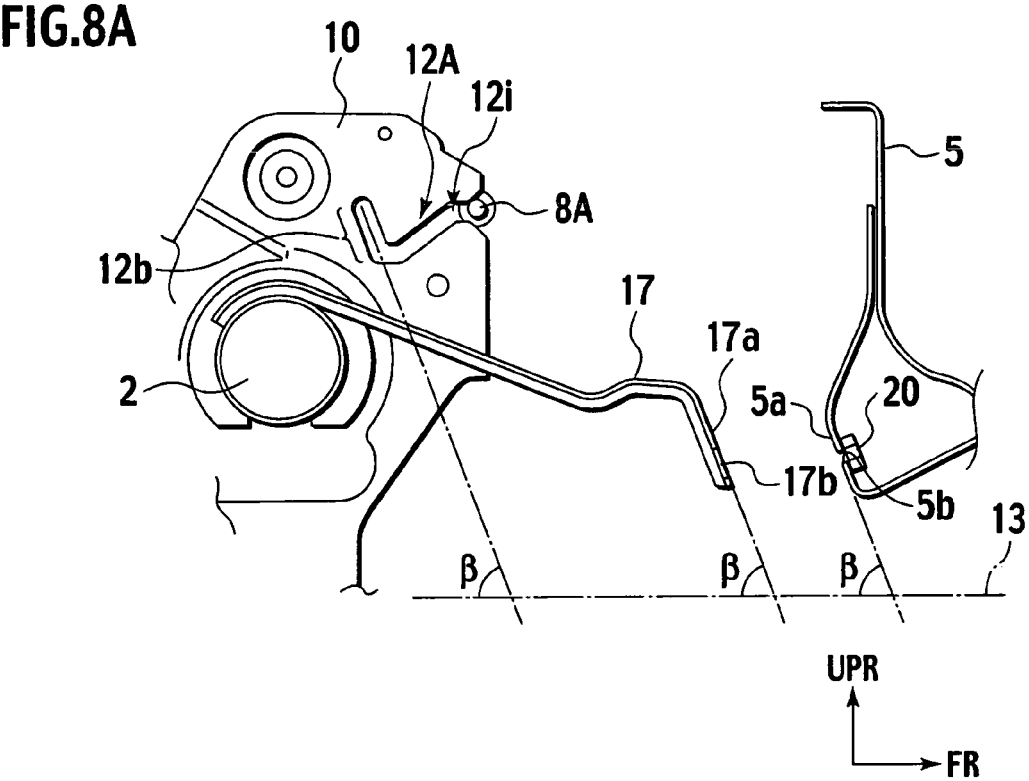
FIG. 8A is a partially cross-sectional and schematic side structural view, as viewed in the same direction as that of FIG. 7, showing a relative positional relationship between a bracket (flange member), a post bracket and the dash panel in a state in which a guide pin is placed in a vicinity of an inlet of a channel during mounting work for the cockpit module in the presently filed embodiment.
Figure 8B:
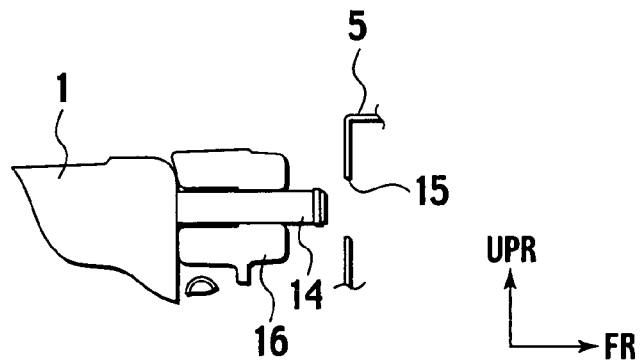
FIG. 8B is a partially cross-sectional and schematic side structural view showing a relative positional relationship between a pipe of a vehicle equipment and the dash panel in the same state of FIG. 8A.
Figure 8C:
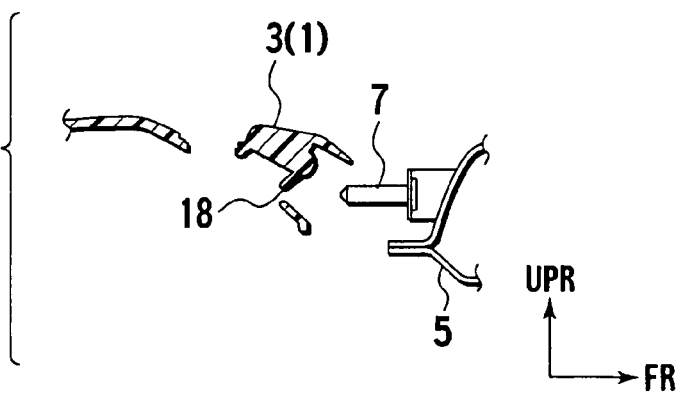
FIG. 8C is a partially cross-sectional and schematic side structural view showing a relative positional relationship between a locate hole, formed in the cockpit module, and the dash panel in the same state of FIG. 8A.
Figure 9A:
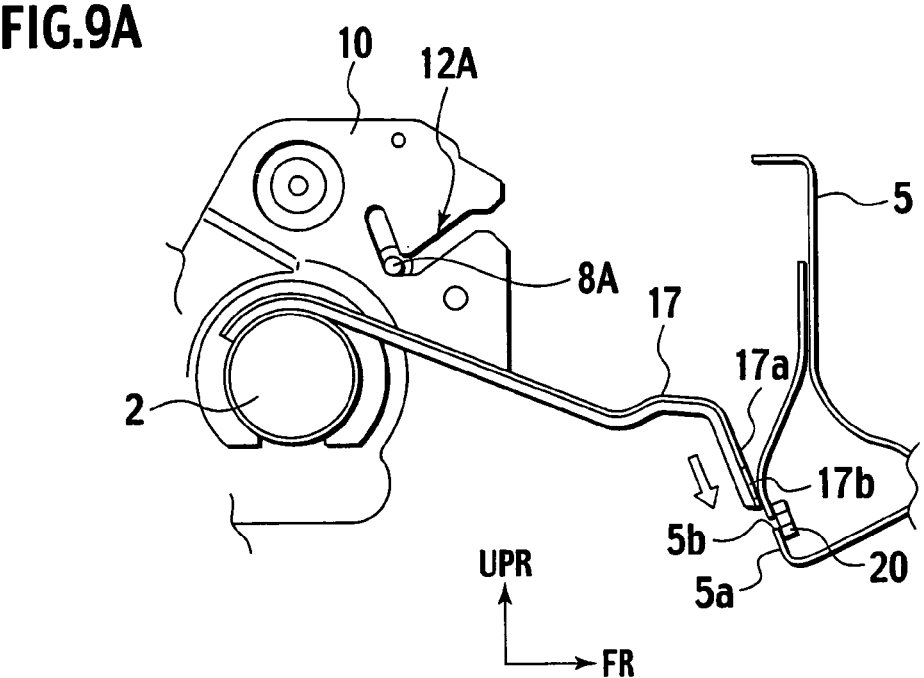
FIG. 9A is a partially cross-sectional and schematic side structural view, as viewed in the same direction as that of FIG. 7, showing a relative positional relationship between the bracket, the post bracket and the dash panel in a state in which the guide pin is disposed in a lower end portion of the channel during the mounting work for the cockpit module in the presently filed embodiment.
Figure 9B:
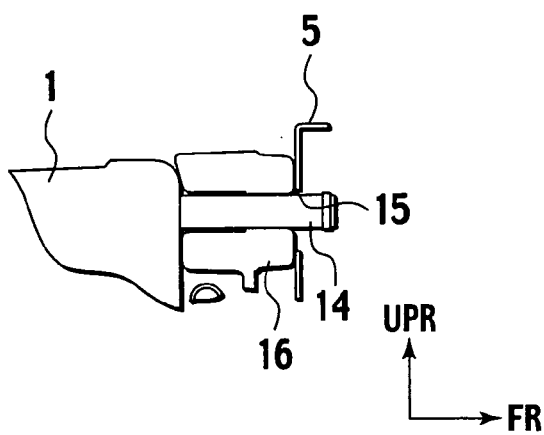
FIG. 9B is a partially cross-sectional and schematic side structural view showing a relative positional relationship between the pipe of the vehicle equipment and the dash panel in the same state of FIG. 9A.
Figure 9C:
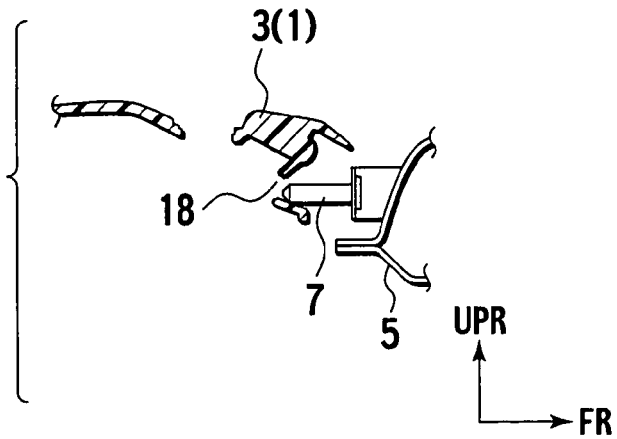
FIG. 9C is a partially cross-sectional and schematic side structural view showing a relative positional relationship between the locate hole, formed in the cockpit module, and the dash panel in the same state of FIG. 9A.
Figure 10A:
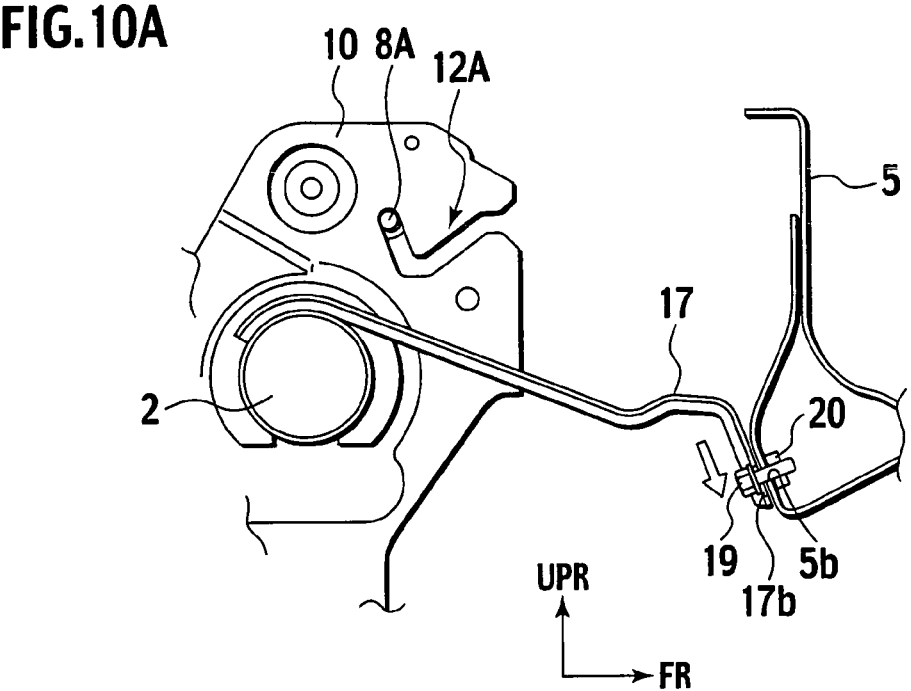
FIG. 10A is a partially cross-sectional and schematic side structural view, as viewed in the same direction as that of FIG. 7, showing a relative positional relationship between the bracket, the post bracket and the dash panel in a state in which the guide pin is placed in a mount position during the mounting work for the cockpit module in the presently filed embodiment.
Figure 10B:
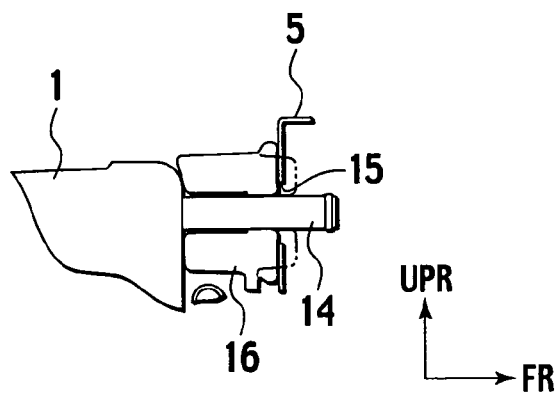
FIG. 10B is a partially cross-sectional and schematic side structural view showing a relative positional relationship between the pipe of the vehicle equipment and the dash panel in the same state of FIG. 10A.
Figure 10C:
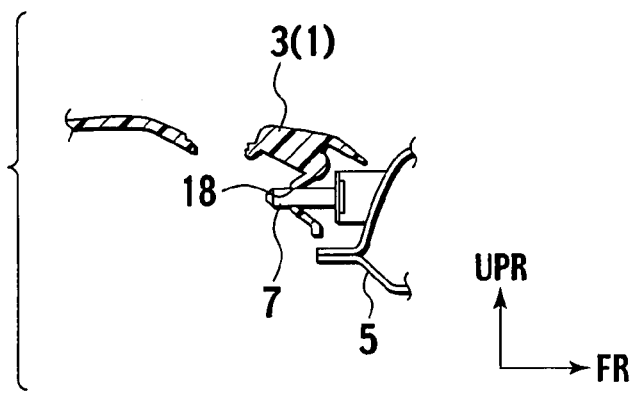
FIG. 10C is a partially cross-sectional and schematic side structural view showing a relative positional relationship between the locate hole, formed in the cockpit module, and the dash panel in the same state of FIG. 10A FIG. 11, which corresponds to FIG. 1, is an exploded perspective view showing a state in which a cockpit module and a dash panel are viewed toward a vehicle body front-side from a vehicle body backside in another example of the presently filed embodiment according to the present invention.

FIG. 1 is an exploded perspective view showing a state in which a cockpit module and a dash panel are viewed toward a vehicle body front-side from a vehicle body backside in the presently filed embodiment; FIG. 2 is a perspective view showing an abutment side, associated with the vehicle body, of the cockpit module as viewed toward the vehicle body backside from the vehicle body front-side in the presently filed embodiment; FIG. 3 is a perspective view showing a framework member of the cockpit module in the presently filed embodiment; FIG. 4 is a partially exploded perspective view showing a flange member located on a left end of the framework member of the cockpit module and a left side front pillar to which the flange member is mounted in the presently filed embodiment; FIG. 5 is a partially exploded perspective view showing a flange member located on a right end of the framework member of the cockpit module and a right side front pillar to which the flange member is mounted in the presently filed embodiment; FIG. 6 is a perspective view showing a right side surface of the flange member shown in FIG. 5; FIG. 7 is a schematic side view of the flange member as viewed along an X-direction shown in FIG. 4; FIG. 8A is a partially cross-sectional and schematic side structural view, as viewed in the same direction as that of FIG. 7, showing a relative positional relationship between a bracket (flange member), a post bracket and the dash panel in a state in which a guide pin is placed in a vicinity of an inlet of a channel during mounting work for the cockpit module in the presently filed embodiment; FIG. 8B is a partially cross-sectional and schematic side structural view showing a relative positional relationship between a pipe of a vehicle equipment and the dash panel in the same state of FIG. 8A; FIG. 8C is a partially cross-sectional and schematic side structural view showing a relative positional relationship between a locate hole, formed in the cockpit module, and the dash panel in the same state of FIG. 8A; FIG. 9A is a partially cross-sectional and schematic side structural view, as viewed in the same direction as that of FIG. 7, showing a relative positional relationship between the bracket, the post bracket and the dash panel in a state in which the guide pin is disposed in a lower end portion of the channel during the mounting work for the cockpit module in the presently filed embodiment; FIG. 9B is a partially cross-sectional and schematic side structural view showing a relative positional relationship between the pipe of the vehicle equipment and the dash panel in the same state of FIG. 9A; FIG. 9C is a partially cross-sectional and schematic side structural view showing a relative positional relationship between the locate hole, formed in the cockpit module, and the dash panel in the same state of FIG. 9A; FIG. 10A is a partially cross-sectional and schematic side structural view, as viewed in the same direction as that of FIG. 7, showing a relative positional relationship between the bracket, the post bracket and the dash panel in a state in which the guide pin is placed in a mount position during the mounting work for the cockpit module in the presently filed embodiment; FIG. 10B is a partially cross-sectional and schematic side structural view showing a relative positional relationship between the pipe of the vehicle equipment and the dash panel in the same state of FIG. 10A; and FIG. 10C is a partially cross-sectional and schematic side structural view showing a relative positional relationship between the locate hole, formed in the cockpit module, and the dash panel in the same state of FIG. 10A.

As shown in FIGS. 1 to 3, the cockpit module 1 is provided with a support member 2, extending in a lateral direction of the vehicle body and serving as a framework member, to which an instrument panel 3 and a steering mechanism 4 are integrally mounted into a module structure.

The cockpit module 1 is mounted to a dash panel 5 and front pillars 6 on side facing a vehicle compartment C from a vehicle body backside. In particular, first, the cockpit module 1 is transferred from the vehicle body backside to a given position (mount position) and temporarily held in the mount position by means of locate pins 7 provided on the dash panel 5 and guide pins 8A to 8D provided on the front pillars 6. With the cockpit module 1 temporarily kept in such a position intact, the cockpit module 1 is fixedly secured to the vehicle body, such as the dash panel 5, by means of bolts that are not shown.

As shown in FIGS. 4 and 5, a guide mechanism 9 is provided for the purpose of permitting the cockpit module 1 to be more easily and reliably transferred to the mount position. More particularly, the guide mechanism 9 is comprised of channels 12A to 12D formed in brackets (flange members) 10, 11 located on both sides of the cockpit module 1 and formed of plate-like members, respectively, and guide pins 8A to 8D protruding from inner surfaces on both sides of the dash panel 5 toward an inside of the vehicle compartment in a horizontal direction in correspondence to the respective channels 12A to 12D.

More particularly, as shown in FIG. 7, the channel 12A provided in the bracket 10 at the left end of the support member 2 is formed so as to extend from a front edge of the bracket 10 toward the vehicle body backside in a horizontally mounting attitude (an attitude in which the cockpit module 1 is mounted in the vehicle body set in horizontal) and has a segment 12a extending downward from an inlet 12i in an oblique direction and a segment 12b folding back at a bottom of the segment 12a and extending upward in an oblique direction. With the channel 12A, the segment 12a extends in the obliquely downward direction at an inclination angle $\alpha$, with respect to a horizontal direction 13, which is smaller than an inclination angle $\beta$, with respect to a horizontal direction 13, at which the segment 12b extends in the obliquely upward direction, with the inlet 12i and an innermost position (mount position) 12j being set at the substantially same height.

As shown in FIG. 7, similarly, another channel 12B provided in the bracket 10 is formed in a position under parallel translation so as to define its position dislocated from the channel 12A in vertical (in a lower area in this example) and horizontal (in a rearward position in this example) directions to be configured in the same shape as that of the channel 12A. Accordingly, even the channel 12B has the segment 12a extending downward in the oblique direction and the segment 12b extending upward in the oblique direction like the channel 12A, with the angle $\alpha$ selected to be smaller than the angle $\beta$ while the inlet 12i and the mount position 12j being aligned on the substantially same height.

In the meanwhile, as shown in FIGS. 5 and 6, the channels 12C and 12D, provided in the bracket 11 at the right end of the support member 2, are located at positions dislocated representatively from the channel 12A under parallel translation, that is, the channels 12A and 12C are located at left and right symmetric positions with respect to one another while the channels 12B and 12D are located at left and right symmetric positions with respect to one another. Moreover, the channels 12C and 12D have basically identical shapes to the channel 12A, that is, the channels 12A, 12B, 12C and 12D have basically identical shapes to one another. Therefore, to describe with a focus on the channels 12C and 12D, these channels are configured in the same shape and provided in positions dislocated in vertical and horizontal directions. However, in contrast to a structure wherein the channels 12A to 12C are formed by cutting out plate-like portions of the brackets 10, 11 into respective profiled shapes, the channel 12D is formed in the bracket 11 at a lower end surface and, thus, no segment 12a, extending downward in the oblique direction is present with only segment 12b, extending upward in the oblique direction, being formed. That is, the channel 12D has an edge 11e formed at a lower end of the bracket 11 in the same profile as an upper portion of the channel 12C and resultantly, as upper portions of the channels 12A and 12B in parallel thereto, whereby the edge 11e is able to achieve the same functions as those of the channels 12A to 12C.

With such a structure set forth above, when mounting the cockpit module 1, the guide pins 8A to 8D are inserted from the inlets 12i to the associated channels 12A to 12D and guided through the channels 12A to 12D to relatively move to the mount positions 12j. Accordingly, the brackets 10, 11 with the channels 12A to 12D formed, respectively, that is, the cockpit module 1 initially move upward in the oblique direction at the inclination angle $\alpha$, which is relatively less acute, in association with the segment 12a and, subsequently, move downward this time in the oblique direction at the inclination angle $\beta$, which is greater than the inclination angle $\alpha$, in association with the segment 12b. Incidentally, since the brackets 10, 11 are formed with the plural parallel channels 12A to 12D, inclined movement of the cockpit module 1 is restricted and the cockpit module 1 is sustained in a substantially fixed attitude (=attitude in the mount position) during a period in which the cockpit module 1 is guided by the guide mechanism 9 to move to the mount position.

Pipes 14, for delivering water, air or coolant of an air conditioning unit, and harnesses penetrate thorough and protrude from a surface, with which the dash panel 5 is held in abutting engagement, of the cockpit module 1 and these pipes 14 and the like are inserted through a through-hole 15 formed in the dash panel 5. With a view to absorbing error in mount position, error in mount positions of the pipes 14 and the like in the cockpit module 1, and vertical displacements of the pipes 14 and the like during mounting work, the through-hole 15 is formed in a larger size than outer diameters of the pipes 14 and the like and, for this reason, a gap can be formed around the pipes 14 and the like in the through-hole 15 under a condition where the cockpit module 1 is mounted.

To fill in such a gap, a seal member (such as urethane rubber) 16 is mounted around the pipes 14 and the like as a resilient member. The seal member 16 is intervened between the cockpit module 1 and the dash panel 5 and compressed to expand in a radial direction when the cockpit module 1 is mounted onto the dash panel 5 to enable the gap to be filled in.

Further, as shown in FIGS. 8A, 9A and 10A, a post bracket 17 is provided on the support member 2 of the cockpit module 1 and extends forward of the vehicle body to be coupled to the vehicle body. An end face (mounting surface) 17a, of a front side at a distal end of the post bracket 17, and an abutment surface 5a of the dash panel 5 are mutually brought into abutting engagement, after which a bolt 19, passing through -holes 17b, 5b, is coupled to a weld nut 20 provided at a rear side (in an forward area of the vehicle body) of the dash panel 5. Such a structure enables to improve rigidity of a portion that supports the steering mechanism 4 of the support member 2. Both the end face 17a of the post bracket 17 and the abutment surface 5a of the dash panel 5 are slanted forward and downward from the vehicle body backside and, more particularly, extend parallel to an extending direction of the channel 12a to be inclined at the angle β with respect to the horizontal direction 13.

Hereunder, further detailed description is made of relative positional variations of various parts, with reference to FIGS. 8A to 10C, during transfer of the cockpit module 1 to the mount position. Incidentally, in FIGS. 8B, 9B and 10B, the pipes 14 and the like to be inserted through the through-hole 15 are shown as a single pipe for the sake of convenience.

As shown in FIG. 8A, the guide pin 8A of the cockpit module 1 is shown under a condition located in the inlet 12i of the associated channel 12A and, under such a condition, the pipes 14 and the like of the cockpit module 1 are not inserted through the though-hole 15 of the dash panel 5 while the locate pin 7 of the dash panel 5 is not inserted through a locate hole 18 of the instrument panel 3 forming one side of the cockpit module 1 as shown in FIGS. 8B and 8C.

Next, under a condition shown in FIGS. 8A to 8C, if the cockpit module 1 is moved forward and upward of the vehicle body in the oblique direction along the channel 12A, the cockpit module 1 reaches a position shown in FIGS. 9A to 9C. More particularly, with such a position, the guide pin 8A is located at the lower end of the segment 12b of the channel 12A as shown in FIG. 9A and, as shown in FIG. 9B, the pipes 14 and the like are inserted through the through-hole 15 while, as shown in FIG. 9C, the seal member 16 around the pipes 14 and the like is brought into abutment with the dash panel at an area around the through-hole 15.

Then, under a condition shown in FIGS. 9A to 9C, if the cockpit module 1 is moved forward and upward of the vehicle body in the oblique direction along the extending direction of the channel 12A, the cockpit module 1 reaches a position shown in FIGS. 10A to 10C. More particularly, with such a position, the through-hole 17b provided in the end face 17a of the post bracket 17 and the through-hole 5b provided in the abutment surface 5a of the dash panel 5 are caused to overlap each other, as shown in FIG. 1A, and under such a condition, using the bolt 19 inserted through the through-holes 17b, 5b enables the post bracket 17 and the dash panel 5 to be coupled.

Simultaneously, as shown in FIG. 10B, upon movement of the cockpit module 1 forward and downward of the vehicle body in the oblique direction from the position shown in FIGS. 9A to 9C to the position shown in FIGS. 10A to 10C, the seal member 16 is collapsed from the configuration, shown in a phantom line, to a shape shown in a solid line. Thus, the gap of the through-hole 15 around the pipes 14 and the like are filled in by the seal member 16 and, as shown in FIG. 10C, the locate pin 7 is inserted through the locate hole 18.

As set forth above, with the mounting structure of the cockpit module of the presently filed embodiment, since the cockpit module 1 is configured to move downward of the vehicle body in the oblique direction, an own weight of the cockpit module 1 and, more specifically, component forces oriented along the channels 12A to 12D are caused to act on the seal member 16 serving as the resilient member to be utilized for collapsing the seal member 16. That is, the presently filed embodiment enables reduction in a pressing force of the cockpit module 1 during mounting work.

Also, since the end face 17a of the post bracket 17 and the abutment surface 5a of the dash panel 5 are slanted downward from the vehicle body backside toward the vehicle body front in the oblique direction, the bolt can be used to achieve coupling work from the vehicle body back side and the downward area of the vehicle body to the upper area of the vehicle body in the oblique direction, enabling improvement in work attitude. Especially, the presence of the end face 17a and the abutment surface 5a made parallel to the direction in which the cockpit module 1 moves in the oblique direction enables the post bracket 17 and the dash panel 5 to more easily and reliably move to a mutually associated joint position.

Further, with the respective channels 12A to 12D, since the inlet 12i and the mount position 12j are aligned on the substantially same height, during an initial stage of assembling work, an assembly worker is enabled to predict a height position under a final mount condition, making it possible to more easily and reliably execute mounting work.

Incidentally, while the presently filed embodiment has been described in connection with the cockpit module with which, in addition to the instrument panel, the steering mechanism is unitized, the present invention is not limited to such a particular structure and an alternative may include a structure with which no steering mechanism is unitized or another alternative may include other component parts.

Figure 11:
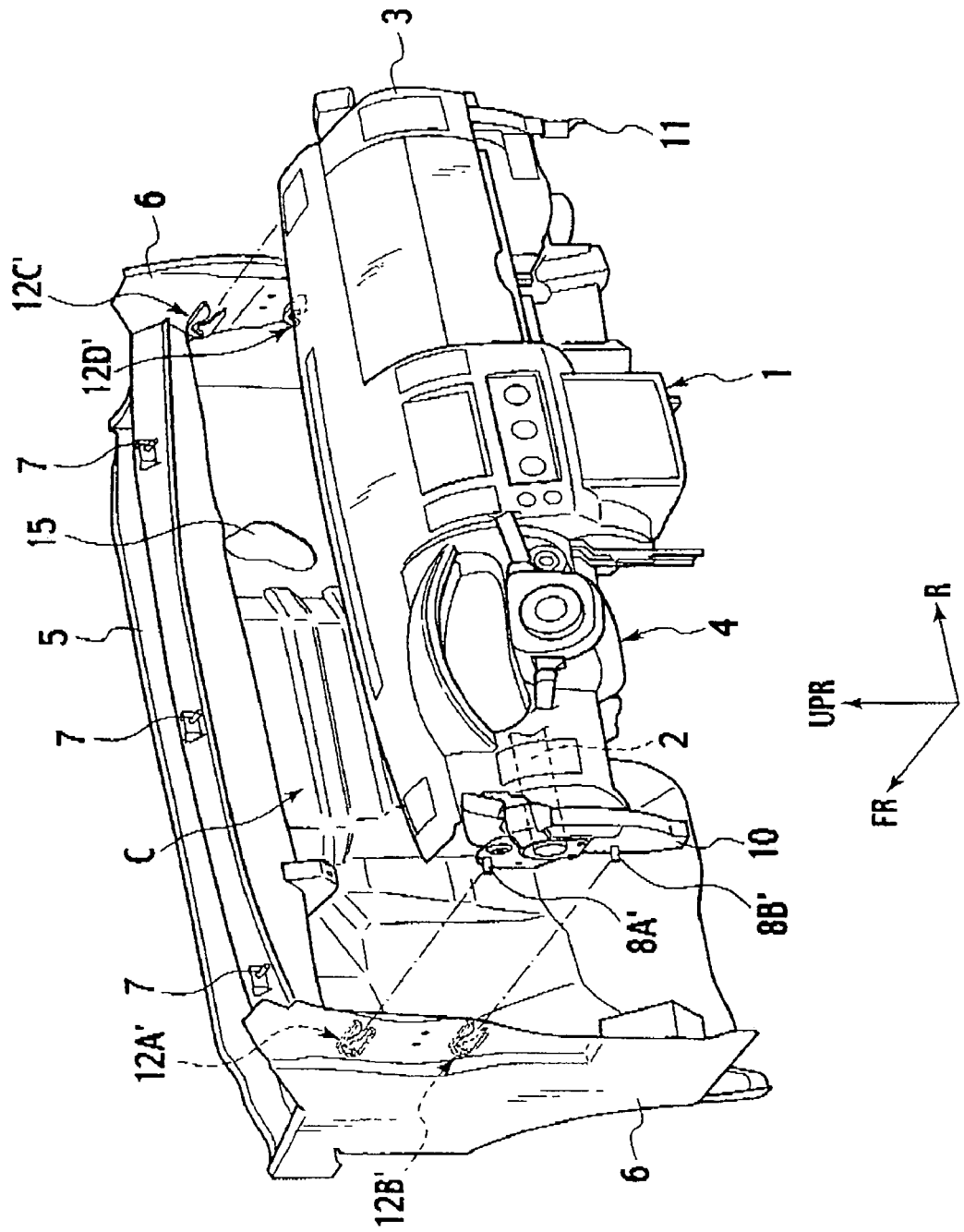
Figure 12:
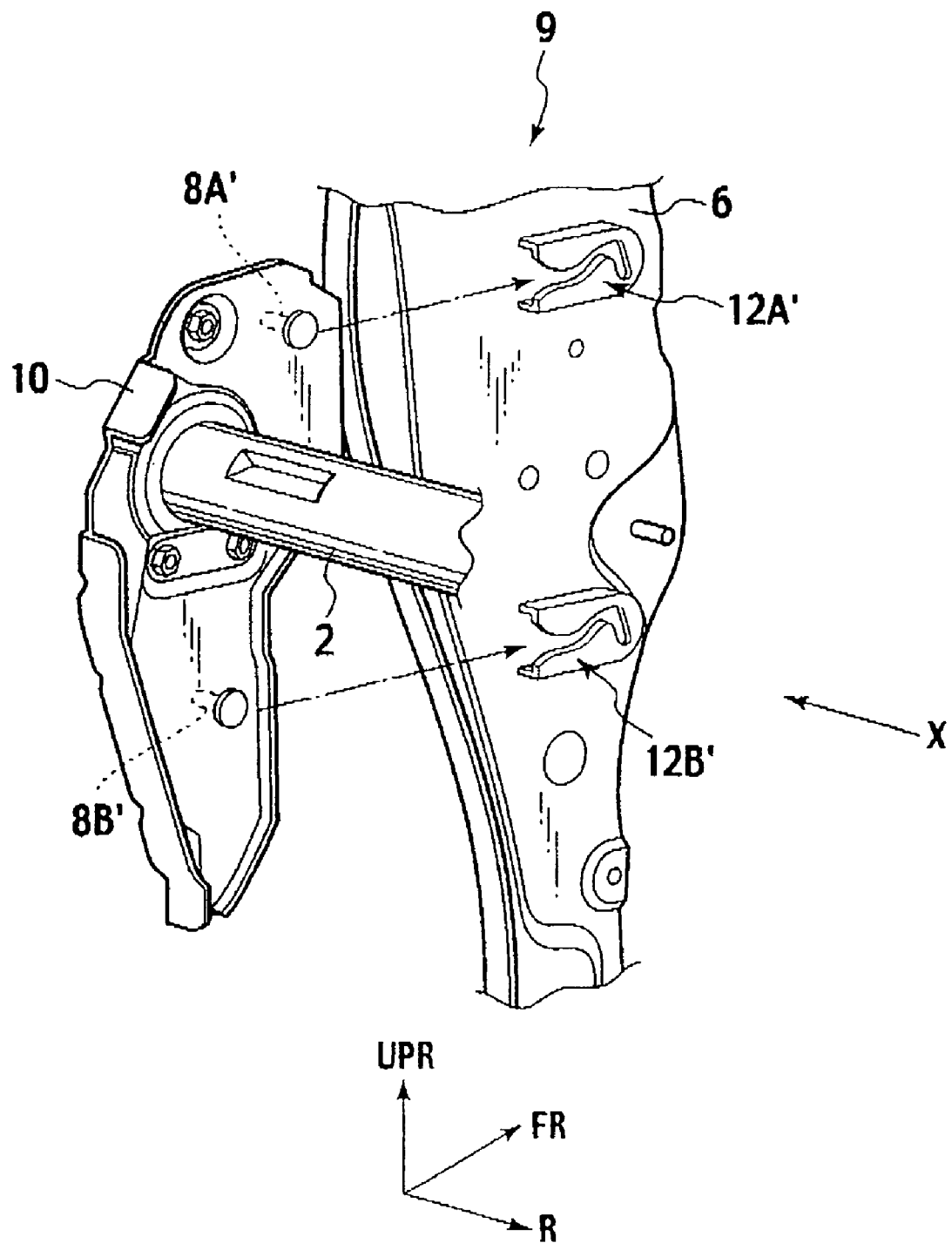
FIG. 12, which corresponds to FIG. 4, is a partially exploded perspective view showing a flange member located on a left end of a framework member of the cockpit module and a left side front pillar to which the flange member is mounted in another example.

Also, as shown FIGS. 11 and 12, the guide mechanism may take a structure wherein the guide pins representatively with reference numeral such as 8A' and 8B' are provided in the cockpit module and, in the meantime, the guide channels with reference numerals such as 12A' to 12D' may be provided in the vehicle body (such as front pillars). However, it is, of course, needless to say that in such a case, the guide channels may take structures that correspond to inversed configurations in shape of the guide channels of the presently filed embodiment, as shown in FIGS. 1, 4, 11 and 12.

The entire content of a Patent Application No. TOKUGAN 2004-172716 with a filing date of Jun. 10, 2004 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A mounting structure for mounting a cockpit module onto a vehicle body on a side facing a vehicle compartment, comprising:

a mount member mounting a cockpit module onto a vehicle body;

a resilient member disposed between the vehicle body and the cockpit module; and a guide mechanism guiding the cockpit module along a given transfer path when the cockpit module is transferred to a mount position of the vehicle body, the guide mechanism guiding the cockpit module in a way to allow the cockpit module to move downward of the vehicle body in an oblique direction through at least a partial segment of the given transfer path such that an own weight of the cockpit module is allowed to apply on the resilient member to press the resilient member between the vehicle body and the cockpit module.

2. The mounting structure according to claim 1, wherein the resilient member is pressed between the vehicle body and the cockpit module to generate elastic deformation to close a gap of a through-hole which is provided in a dash panel of the vehicle body and through which a component member penetrates.

3. The mounting structure according to claim 1, wherein the guide mechanism includes a guide pin provided in either one of the vehicle body and the cockpit module, and a guide channel provided in the other one of the vehicle body and the cockpit module to guide the guide pin along the given transfer path.

4. The mounting structure according to claim 3, wherein the guide channel is formed by cutting out a plate portion of a plate-like member provided in the dash panel.

5. The mounting structure according to claim 3, wherein the guide channel is formed at a lower end face of a plate-like member provided in the cockpit module.

6. The mounting structure according to claim 3, wherein the guide channel has an inlet, and a height position of the inlet of the guide channel and that of a mount position, with which the cockpit module is to be mounted, of the guide channel are set to the same height position.

7. The mounting structure according to claim 1, wherein the given transfer path allows the cockpit module to move upward in an oblique direction of the vehicle body after which the cockpit module is moved downward in an oblique direction of the vehicle body.

8. The mounting structure according to claim 1, wherein a mounting surface between the mount member and the vehicle body for the cockpit module to be mounted to the vehicle body is slanted forward and downward in an oblique direction from rear of the vehicle body.

9. The mounting structure according to claim 1, wherein the mount member is connected to a framework member of the cockpit module, the framework member extending in a lateral direction of the vehicle body.

10. A mounting structure for mounting a cockpit module onto a vehicle body on a side facing a vehicle compartment, comprising:
   mounting means for mounting a cockpit module onto a vehicle body;
   dimensionally changing means for changing a shape dimensionally and resiliently, the dimensionally changing means being disposed between the vehicle body and the cockpit module; and
   guiding means for guiding the cockpit module along a given transfer path when the cockpit module is transferred to a mount position of the vehicle body, the guiding means guiding the cockpit module in a way to allow the cockpit module to move downward of the vehicle body in an oblique direction through at least a partial segment of the given transfer path such that an own weight of the cockpit module is allowed to apply on the dimensionally changing means to press the dimensionally changing means between the vehicle body and the cockpit module.

11. A method of mounting a cockpit module onto a vehicle body on a side facing a vehicle compartment, comprising:
   providing a resilient member between a vehicle body and a cockpit module;
   guiding the cockpit module along a given transfer path when the cockpit module is transferred to a mount position of the vehicle body to allow the cockpit module to move downward of the vehicle body in an oblique direction through at least a partial segment of the given transfer path;
   causing an own weight of the cockpit module to act on the resilient member to press the resilient member between the vehicle body and the cockpit module; and
   mounting the cockpit module onto the vehicle body.

* * * * *